(12) United States Patent
Gates et al.

(10) Patent No.: US 7,874,533 B1
(45) Date of Patent: Jan. 25, 2011

(54) ATV MOUNTING BRACKET AND ASSOCIATED TOOL STORAGE SYSTEMS

(75) Inventors: George D. Gates, South Jordan, UT (US); Travis D. Gates, Riverton, UT (US); Stacey L. Gates, Riverton, UT (US)

(73) Assignee: All Rite Products, Inc., West Jordan, UT (US)

( * ) Notice: Subject to any disclaimer, the term of this patent is extended or adjusted under 35 U.S.C. 154(b) by 376 days.

(21) Appl. No.: 11/875,647

(22) Filed: Oct. 19, 2007

Related U.S. Application Data

(60) Provisional application No. 60/855,939, filed on Oct. 31, 2006.

(51) Int. Cl.
*F16B 1/00* (2006.01)
*E04G 7/18* (2006.01)

(52) U.S. Cl. .......... 248/205.1; 248/219.4; 248/214; 248/230.5; 403/398; 403/385; 403/394

(58) Field of Classification Search .......... 248/205.1, 248/558, 214, 218.4, 219.3, 219.4, 223.31, 248/227.4, 230.1, 230.5, 231.61, 231.85, 248/541; 211/107; 403/398, 384, 396, 385, 403/394
See application file for complete search history.

(56) References Cited

U.S. PATENT DOCUMENTS

| | | | |
|---|---|---|---|
| 1,777,884 A * | 10/1930 | Horix | 248/230.5 |
| 1,860,994 A * | 5/1932 | Church | 439/208 |
| 2,164,022 A * | 6/1939 | Rowe | 439/175 |
| 2,179,516 A * | 11/1939 | Patrick | 403/394 |
| 2,875,805 A | 3/1959 | Flora | |
| 2,894,773 A * | 7/1959 | Noe | 403/385 |
| 3,076,627 A | 2/1963 | Huron | |
| 3,513,896 A | 5/1970 | Neuschotz | |
| 3,604,676 A * | 9/1971 | Weber | 248/68.1 |
| 3,667,526 A | 6/1972 | Neuschotz | |
| 4,363,581 A | 12/1982 | Pease | |
| D270,516 S | 9/1983 | Achille | |
| D287,931 S | 1/1987 | Crone | |
| 5,149,040 A | 9/1992 | Heath | |
| D347,782 S | 6/1994 | Wentzel | |
| D349,038 S | 7/1994 | Sachs | |
| 5,358,423 A * | 10/1994 | Burkhard et al. | 439/402 |
| D377,448 S | 1/1997 | Nakamura | |
| D379,756 S | 6/1997 | Parduhn | |

(Continued)

OTHER PUBLICATIONS

Gates et al., U.S. Appl. No. 11/329,398, filed Jan. 9, 2006.

*Primary Examiner*—Anita M King
(74) *Attorney, Agent, or Firm*—Thorpe North & Western LLP

(57) ABSTRACT

A mounting bracket for use in mounting an auxiliary device to a vehicle comprises an engagement section, operable to engage a section of the vehicle to limit movement of the bracket relative to the section of the vehicle. The engagement section includes at least two engagement channels having differing directions of extension. Each of the at least two channels includes an engagement surface shaped to at least partially receive therein the section of the vehicle. A plurality of engagement teeth extend from each of the engagement surfaces, the plurality of engagement teeth being operable to engage the section of the vehicle to limit movement of the body relative to the section of the vehicle.

17 Claims, 3 Drawing Sheets

U.S. PATENT DOCUMENTS

| | | | |
|---|---|---|---|
| D386,366 S | 11/1997 | Rimback et al. | |
| 5,927,667 A | 7/1999 | Swanson | |
| 6,106,189 A * | 8/2000 | Seale | 403/398 |
| 6,109,576 A | 8/2000 | Szewczyk | |
| D434,637 S | 12/2000 | Habeck et al. | |
| 6,209,836 B1 | 4/2001 | Swanson | |
| D453,102 S | 1/2002 | Postelwait | |
| 6,382,488 B1 | 5/2002 | Hancock | |
| D464,557 S | 10/2002 | Alejandro | |
| 6,484,913 B1 | 11/2002 | Hancock et al. | |
| D466,856 S | 12/2002 | Gates et al. | |
| 6,527,240 B1 | 3/2003 | Huang | |
| 6,561,473 B1 * | 5/2003 | Ianello | 248/219.4 |
| 6,588,637 B2 | 7/2003 | Gates et al. | |
| 6,719,255 B2 * | 4/2004 | Chen | 248/323 |
| D492,893 S | 7/2004 | Oddsen et al. | |
| 6,776,116 B2 | 8/2004 | Murphy et al. | |
| D506,918 S | 7/2005 | Nakajima | |
| D515,910 S | 2/2006 | Gates et al. | |
| 2003/0168484 A1 | 9/2003 | Gates et al. | |
| 2005/0269465 A1 | 12/2005 | Carnevali | |

* cited by examiner

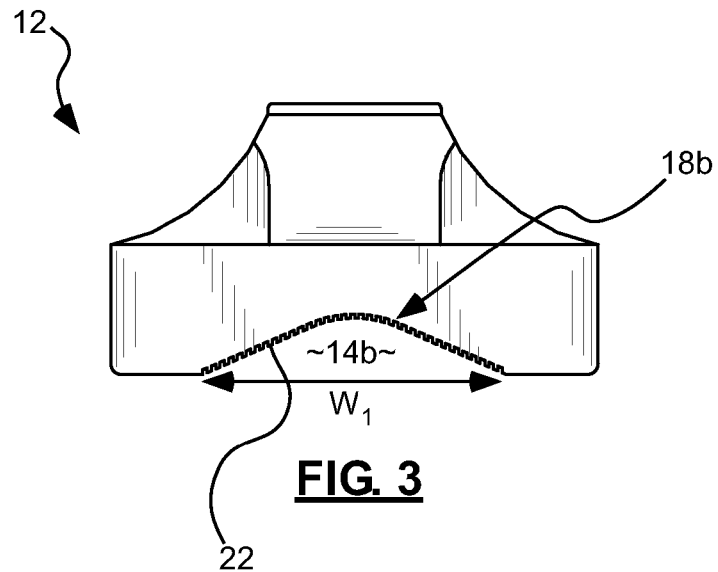
FIG. 3
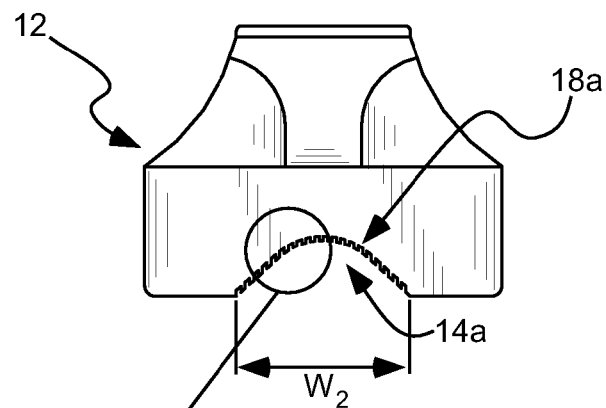
FIG. 4
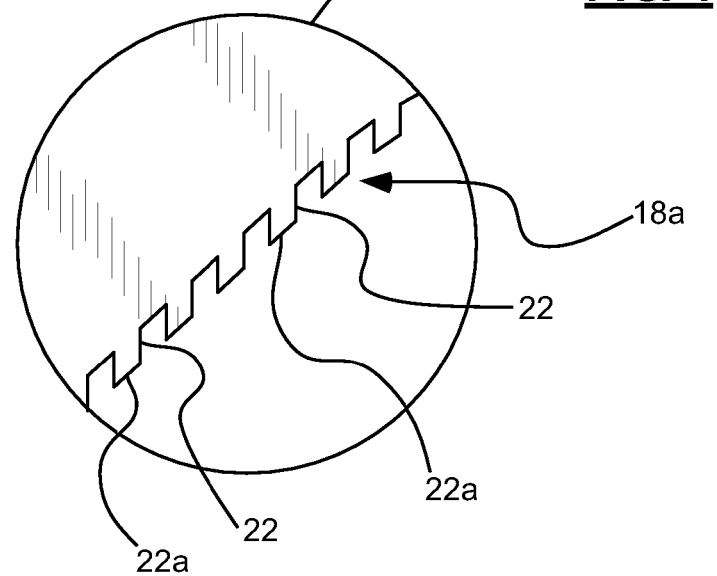

ATV MOUNTING BRACKET AND ASSOCIATED TOOL STORAGE SYSTEMS

Priority is claimed of U.S. Provisional Patent Application No. 60/855,939, filed Oct. 31, 2006, which is hereby incorporated herein in its entirety.

FIELD OF THE INVENTION

The present invention relates generally to systems for mounting auxiliary devices to vehicles. More particularly, the present invention relates to systems for mounting auxiliary devices to vehicles suited for off-road use, such as all-terrain-vehicles ("ATVs") and side-by-side (or off road utility) vehicles commonly referred to as "UTVs," etc., that may be subject to considerable vibrational forces during use.

BACKGROUND OF THE INVENTION

ATVs, UTVs, motorcycles, snowmobiles, etc., are used by many people for recreation, hunting, transportation, outdoor work activities, etc. As part of many of these activities, the person participating in the activity desires to carry with them an auxiliary device such as a rifle, shotgun, tools, bow, scopes, camera equipment, etc. In order to safely and effectively operate the vehicle in question while transporting such equipment, the operator often mounts the auxiliary device to the vehicle to maintain the hands of the operator in an unencumbered state. In an effort to ensure that such auxiliary devices are safely and securely attached to the ATV while it is being operated, a variety of mounting systems have been developed that attempt to both ensure that the mounting system is securely attached to the vehicle, and provide secure attachment of the auxiliary device to the mounting system.

SUMMARY OF THE INVENTION

In accordance with one aspect of the invention, a mounting bracket for use in mounting an auxiliary device to a vehicle is provided, including an engagement section, operable to engage a section of the vehicle to limit movement of the bracket relative to the section of the vehicle. The engagement section can include at least two engagement channels having differing directions of extension. Each of the at least two channels can include an engagement surface shaped to at least partially receive therein the section of the vehicle. A plurality of engagement teeth can extend from each of the engagement surfaces, the plurality of engagement teeth being operable to engage the section of the vehicle to limit movement of the body relative to the section of the vehicle.

In accordance with another aspect of the invention, a mounting bracket for use in mounting an auxiliary device to a vehicle is provided, including an engagement section, operable to engage a section of the vehicle to limit movement of the bracket relative to the section of the vehicle. The engagement section can include at least two engagement channels. Each of the at least two engagement channels can include an engagement surface shaped to at least partially receive therein the section of the vehicle. The engagement channels can have: differing directions of extension; and differing engagement profiles.

In accordance with another aspect of the invention, a mounting bracket for use in mounting an auxiliary device to a vehicle is provided, including an engagement section, operable to engage a section of the vehicle to limit movement of the bracket relative to the section of the vehicle. The engagement section can include at least two engagement channels. Each of the at least two engagement channels can include an engagement surface shaped to at least partially receive therein the section of the vehicle. A plurality of engagement teeth can extend from each of the engagement surfaces, the plurality of engagement teeth being operable to engage the section of the vehicle to limit movement of the body relative to the section of the vehicle.

In accordance with another aspect of the invention, a method of forming a mounting bracket for use in mounting an auxiliary device to a vehicle is provided, including: forming an engagement section in a bracket body, the engagement section being operable to engage a section of the vehicle to limit movement of the bracket relative to the section of the vehicle; forming at least two engagement channels in the engagement section, the at least two engagement channels having differing directions of extension, and each having an engagement surface shaped to at least partially receive therein the section of the vehicle; and forming a plurality of engagement teeth on each of the engagement surfaces, the plurality of engagement teeth being operable to engage the section of the vehicle to limit movement of the body relative to the section of the vehicle.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 3 is a side view of the mounting bracket of FIG. 1;

FIG. 4 is an orthogonal side view of the mounting bracket of FIG. 1;

DETAILED DESCRIPTION

Figure 1:
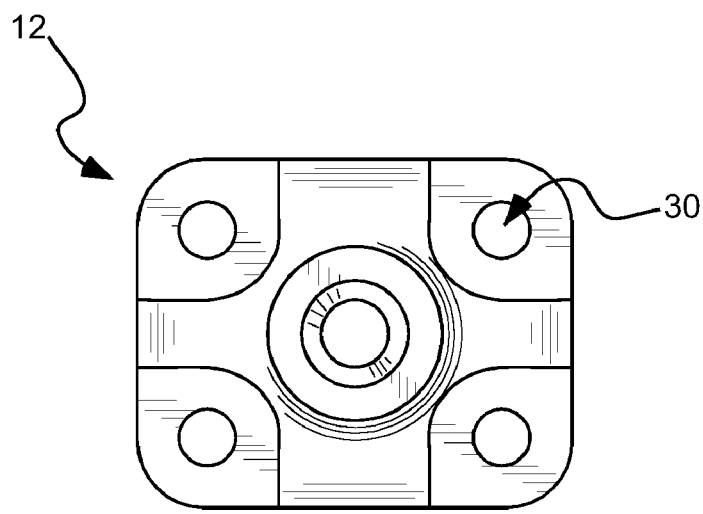
FIG. 1 is a top view of a mounting bracket for use in mounting an auxiliary device to a vehicle in accordance with an embodiment of the present invention.

Before the present invention is disclosed and described, it is to be understood that this invention is not limited to the particular structures, process steps, or materials disclosed herein, but is extended to equivalents thereof as would be recognized by those of ordinarily skilled in the relevant arts. It should also be understood that terminology employed herein is used for the purpose of describing particular embodiments only and is not intended to be limiting.

It must be noted that, as used in this specification and the appended claims, the singular forms "a" and "the" include plural referents, unless the context clearly dictates otherwise. Thus, for example, reference to a "lifting link" includes one or more of such links and reference to "parallel link" includes reference to one or more of such links.

DEFINITIONS

In describing and claiming the present invention, the following terminology will be used in accordance with the definitions set forth below.

As used herein, the term "auxiliary device" is to be understood to refer to an object that can be mounted to at least a portion of an ATV or UTV in order to be transported by the vehicle. Examples of auxiliary devices include, without limitation, tools, such as shovels, rakes, picks, etc., guns, bows, camera equipment, scopes, and also intermediate structures on which such devices can be mounted or rested, such as cradle structures, hooks, holders, and the like.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value and should apply regardless of the breadth of the range or the characteristics being described.

Invention

The present invention generally provides a mounting brackets, and associated systems and methods, suitable for attaching or mounting an auxiliary device to a vehicle. The brackets of the present invention can be advantageously utilized to mount auxiliary devices to vehicles that include, without limitation, all-terrain-vehicles "(ATVs"), side-by-side or utility vehicles ("UTVs"), motorcycles, tractors, golf carts, and the like. Many of these types of vehicles are suitable for operation in relatively rough terrain, which can result in vibrational and impact forces being applied to objects carried by the vehicles. These types of sustained forces can often result in objects being held on the vehicle (and/or devices used to hold objects) becoming loosened and/or repositioned. The present invention provides a mounting bracket that can securely retain such objects (or object holders) on portions of vehicles without becoming loosened or repositioned during normal operation of the vehicle.

Figure 5:
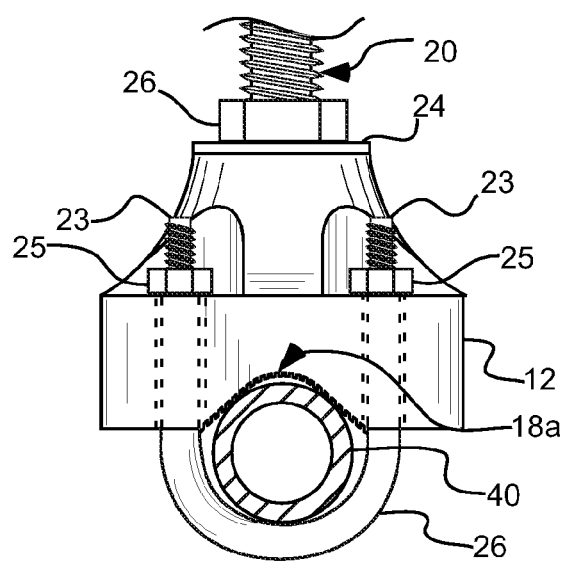
FIG. 5 is a side view of the mounting bracket of FIG. 1, shown in exemplary use attached to a vehicle and having an auxiliary device attached thereto.
Figure 6:
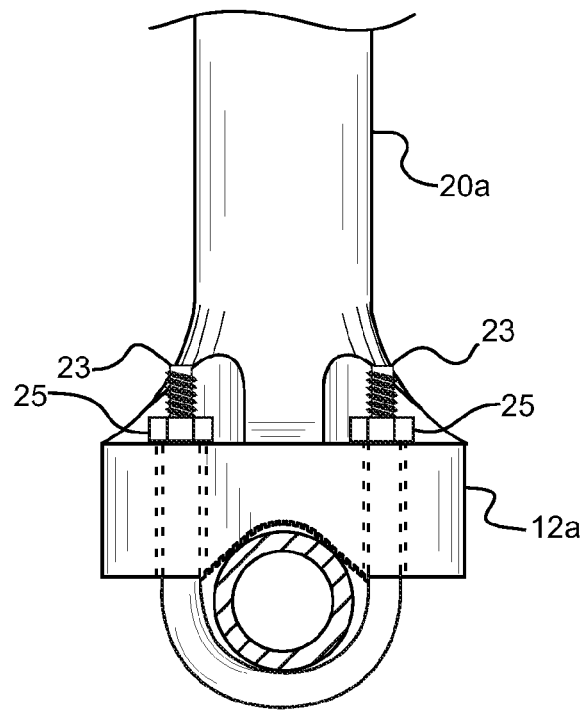
FIG. 6 is a side view of an exemplary application in which the mounting bracket is formed integrally with an auxiliary device.

As shown by example in the figures, in one embodiment the present invention provides a mounting bracket 12 for use in mounting an auxiliary device (a portion of which is shown at 20 in FIGS. 5 and 20a in FIG. 6) to a vehicle (a portion of which is shown at 40 in FIGS. 5 and 6). The mounting bracket can include an engagement section that can be operable to engage a section of the vehicle to limit movement of the bracket relative to the section of the vehicle. The engagement section can include at least two engagement channels 14a, 14b that can include differing directions of extension 16a, 16b, respectively. Each of the engagement channels can include an engagement surface 18a (FIG. 4), 18b (FIG. 3), respectively, shaped to at least partially receive therein the section of the vehicle. A plurality of engagement teeth 22 (FIGS. 3 and 4) can extend from each of the engagement surfaces. The plurality of engagement teeth can be operable to engage the section of the vehicle to limit movement of the body relative to the section of the vehicle.

FIG. 5 illustrates an exemplary application in which an auxiliary device (shown representatively at 20) is attached to an upper portion of the mounting bracket 12. While not so required, the mounting bracket can include an insert 24 formed therein (or attached thereto) that can be used to engage a nut 26 or other fastener to the mounting bracket. In this manner, the auxiliary device can be securely attached to the mounting bracket.

The mounting bracket 12 can be attached to a portion or section 40 (e.g., a handlebar portion, a cargo rack portion, a seat frame portion, a section of a roll-bar or cab cage, etc.) of the vehicle by first engaging the portion 40 within an engagement channel (in this case channel 14a) of the mounting bracket. A U-bolt (or similar structure) 26 can include threaded ends 23 that extend through holes 30 formed in the bracket, nuts 25 (or other suitable fasteners) can be secured to the threaded ends. By securely tightening the nuts 25, the mounting bracket can be securely cinched to the portion 40 of the vehicle. As discussed in more detail below, the engagement teeth 22 can aggressively engage the surface of the portion 40 of the vehicle and ensure that the mounting bracket does not slide longitudinally along the portion of the vehicle, or rotate relative to the portion of the vehicle.

Figure 2:
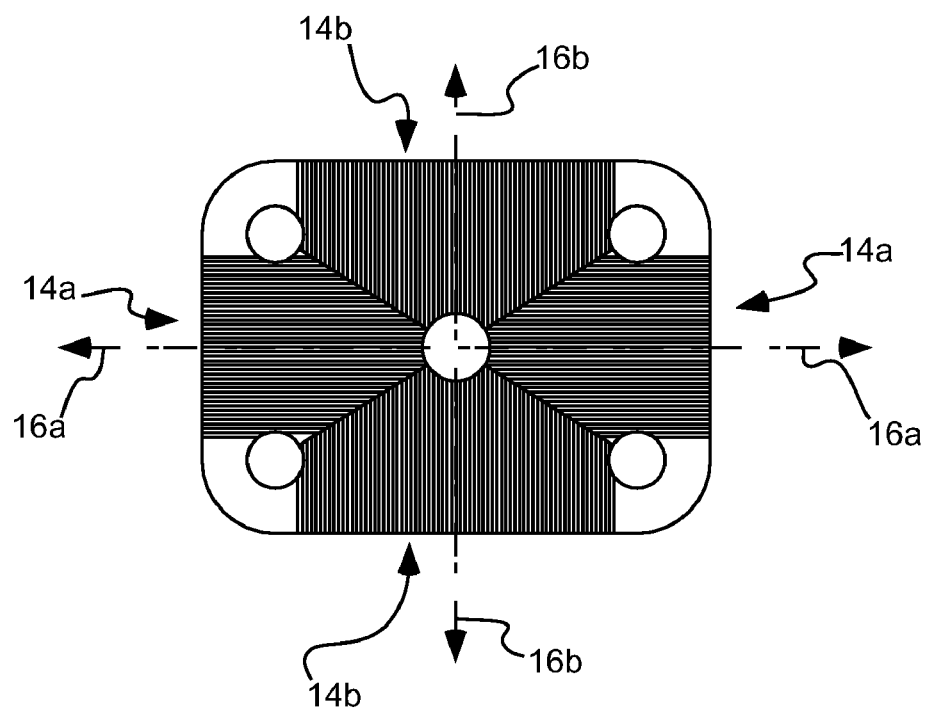
FIG. 2 is a bottom view of the mounting bracket of FIG. 1.

The engagement channels 14a, 14b can include differing directions of extension, as indicated in FIG. 2 by directions of extension 16a, 16b, respectively. While not so required, in the embodiment shown, the directions of extension differ by about 90 degrees: that is, they extend orthogonally to one another. In this manner, where it is desired to use one of the engagement channels rather than another, the mounting bracket can be relatively easily rotated to align an adjacent engagement channel with the section or portion of the vehicle to be engaged. The direction of extension of the engagement channels can differ by varying degrees: for example, they can be offset by about 90 degrees, as shown, or by about 30 degrees, about 45 degrees, etc.

Each of the engagement channels 14a, 14b can include an engagement surface 18a, 18b, respectively, that can define or present an engagement profile (best appreciated in FIGS. 4 and 3, respectively). The engagement profiles can differ in a variety of manners. In the aspect of the invention illustrated in FIGS. 3 and 4, the engagement profiles differ in both a size and a relative shape. By altering the size and/or shape (or some other feature) of the engagement channels, each channel can be optimized for engaging a geometry, size or material of the portion 40 of the vehicle to which the mounting bracket is attached.

In one example, it has been found that sizes of various portions of ATVs and UTVs generally differ. For example, the handlebar and cargo rack portions of a typical ATV are generally on the order of about 1 inch in diameter or less, and the roll bars or support bars that form the cages or cabs of UTVs are generally on the order of about 1.75 inches in diameter or less. Thus, in one embodiment of the invention, an opening width "$W_1$" of engagement channel 14b (FIG. 3) can be on the order of about 1.688 inches, while an opening width "W2" of engagement channel 14a (FIG. 4) can be on the order of about 1 inch. In addition, a radius of curvature of the engagement profiles can differ, with a radius of curvature of engagement channel 14b being on the order of about 0.625 inches and a radius of curvature of engagement channel 14a being on the order of about 0.375 inches.

Thus, in the embodiments illustrated in the figures, the mounting bracket is well suited for use with either a typical ATV or a typical UTV, and can be easily switched between the two. In this manner, a single mounting bracket can be sold by a vendor (or obtained by a consumer) that can be used for either ATV or UTV applications (or, alternately, both).

As best appreciated in FIG. 4, in one aspect of the invention, the engagement teeth 22 can include a substantially planar engagement surface 22a that can be positioned to engage the portion or section of the vehicle received within the engage channel. It has been found that engagement teeth formed in such a manner tend to compress (under load) in a substantially uniform manner, and do not tend to fold or bend laterally under load. The engagement teeth of the present invention can thus provide a very aggressive "grip" on the portion of the vehicle to which the mounting bracket is attached, while also being well suited for repeatedly, over time, being attached and removed from the portion of the vehicle. In other words, the mounting bracket can be secured to a portion of a vehicle, then removed from that portion, and the engagement teeth will return to their normal, relaxed condition shown in the figures.

As also shown in FIG. 4, in one embodiment of the invention the engagement teeth can include a substantially matching height and width, and can be spaced from one another a substantially constant distance that corresponds to the height and width of the teeth. In one aspect of the invention, the height, width and spacing distance of the engagement teeth are each about 0.025 inches. While not so required, the engagement teeth can extend laterally along substantially all of the engagement surfaces 18a, 18b: alternately, the engagement teeth can be formed or attached along only a portion of the engagement surface.

As illustrated in FIG. 2, the engagement teeth can comprise substantially elongate engagement teeth (or blades) that extend substantially parallel to a direction of extension of the engagement channels. Thus, in one aspect of the invention, the engagement teeth can extend inwardly toward a center of the mounting bracket to provide a large amount of engagement surface to contact the portion (40, FIGS. 5 and 6) of the vehicle to which the attachment bracket is mounted.

In the embodiments shown in the figures, at least some of the engagement teeth 22 can include a differing length than do adjacent engagement teeth. Also, at least some of the engagement teeth can intersect with engagement teeth of an engagement channel having a differing direction of extension. This relationship is illustrated in FIG. 2, where the engagement teeth of engagement channels 14a and 14b extend inwardly toward a center of the mounting bracket, until the engagement teeth intersect with those of an adjacent engagement channel.

In addition to the generally solid block illustrated in the figures, in one embodiment of the invention (not shown in the figures), the mounting bracket is formed as a shell, having a thickness on the order of about 0.25 inches. In this embodiment, the engagement teeth can be arranged along the width of the shell and will not extend further inward toward the center of the bracket.

The mounting bracket 12 can be formed from a variety of materials, including metallic materials, polymeric materials, composites, etc. In one aspect of the invention, the bracket is formed from a type of material that can be injection molded or otherwise manipulated during manufacture of the bracket. The body can be formed of a polymer, nylon, plastic, etc. In one aspect, the body is formed of 10% glass-filled Nylon 6. The engagement teeth can be formed simultaneously with the bracket and can be, but are not necessarily, formed of the same material as the bracket.

The material of the engagement teeth 22 can be a substantially resilient material that flexes slightly under load. In this manner, the engagement teeth can aggressively engage the portion 40 of the vehicle to which the bracket 12 is attached, without scratching, denting or otherwise damaging or marring the material of the portion of the vehicle. It is anticipated that oftentimes the portion of the vehicle to which the mounting bracket is attached will be a metallic material having an aesthetically pleasing finish applied thereto. The engagement teeth of the present invention have been found to engage such materials without damaging the appearance of the material.

FIG. 6 illustrates a further embodiment of the invention, in which the attachment bracket 12a is formed as an integral portion of an auxiliary device 20a. Thus, the attachment bracket of the present invention can be utilized as a stand-alone device, to which an auxiliary device will be attached (as shown in the example of FIG. 5); or, the attachment bracket can be integrally formed as a portion of the auxiliary device.

In addition to the structural features discussed above, the present invention also provides a method of forming a mounting bracket for use in mounting an auxiliary device to a vehicle, comprising: forming an engagement section in a bracket body, the engagement section being operable to engage a section of the vehicle to limit movement of the bracket relative to the section of the vehicle; forming at least two engagement channels in the engagement section, the at least two engagement channels having differing directions of extension, and each having an engagement surface shaped to at least partially receive therein the section of the vehicle; and forming a plurality of engagement teeth on each of the engagement surfaces, the plurality of engagement teeth being operable to engage the section of the vehicle to limit movement of the body relative to the section of the vehicle.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

We claim:

1. A mounting bracket for use in mounting an auxiliary device to a vehicle, comprising:
   an engagement section, operable to engage a section of the vehicle to limit movement of the bracket relative to the section of the vehicle, the engagement section including at least two engagement channels having differing directions of extension;
   each of the at least two channels including an engagement surface shaped to at least partially receive therein the section of the vehicle; and
   a plurality of engagement teeth extending from each of the engagement surfaces, the plurality of engagement teeth being operable to engage the section of the vehicle to limit movement of the body relative to the section of the vehicle; wherein
   the engagement teeth comprise elongate engagement teeth extending parallel to a direction of extension of the engagement channels; and at least some of the engagement teeth intersect with engagement teeth of an engagement channel having a differing direction of extension and wherein at least some of the engagement teeth include a differing length than an adjacent engagement tooth.

2. The mounting bracket of claim 1, wherein the at least two engagement channels each include an engagement profile, and wherein the engagement profiles differ in at least one of a shape and a size.

3. The mounting bracket of claim 1, wherein the engagement teeth include a substantially planar engagement surface positioned to engage the section of the vehicle received within the engage channel.

4. The mounting bracket of claim 1, wherein the engagement teeth include a substantially matching height and width.

5. The mounting bracket of claim 1, wherein the mounting bracket is formed from a resilient material.

6. The mounting bracket of claim 5, wherein the resilient material includes nylon.

7. The mounting bracket of claim 1, wherein the at least two engagement channels include directions of extension that are oriented orthogonally to one another.

8. A mounting bracket for use in mounting an auxiliary device to a vehicle, comprising:
   an engagement section, operable to engage a section of the vehicle to limit movement of the bracket relative to the section of the vehicle;
   the engagement section including at least two engagement channels, each of the at least two engagement channels including an engagement surface shaped to at least partially receive therein the section of the vehicle;
   a plurality of engagement teeth extending from each of the engagement surfaces, the plurality of engagement teeth being operable to engage the section of the vehicle to limit movement of the body relative to the section of the vehicle; wherein
   the engagement channels have: differing directions of extension and differing engagement profiles;
   the engagement teeth comprise elongate engagement teeth extending parallel to a direction of extension of the engagement channels; and
   at least some of the engagement teeth include a differing length than an adjacent engagement tooth.

9. The mounting bracket of claim 8, wherein the differing engagement profiles differ in shape.

10. The mounting bracket of claim 8, wherein the differing engagement profiles differ in size.

11. The mounting bracket of claim 8, wherein the at least two engagement channels are shaped to receive differently sized sections of the vehicle.

12. The mounting bracket of claim 8, wherein the engagement teeth include a substantially planar engagement surface positioned to engage the section of the vehicle received within the engage channel.

13. The mounting bracket of claim 8, wherein the engagement teeth include a substantially matching height and width.

14. The mounting bracket of claim 8, wherein the mounting bracket is formed from a resilient material.

15. The mounting bracket of claim 8, wherein the resilient material includes nylon.

16. The mounting bracket of claim 8, wherein the at least two engagement channels include directions of extension that are oriented orthogonally to one another.

17. The mounting bracket of claim 8, wherein at least some of the engagement teeth intersect with engagement teeth of an engagement channel having a differing direction of extension.

\* \* \* \* \*